(12) United States Patent
Filippone (10) Patent No.: US 7,882,832 B2
(45) Date of Patent: Feb. 8, 2011

(54) SOLAR PUMP SYSTEMS AND RELATED METHODS

(76) Inventor: Claudio Filippone, 8708 48th Pl., College Park, MD (US) 20740

( * ) Notice: Subject to any disclaimer, the term of this patent is extended or adjusted under 35 U.S.C. 154(b) by 747 days.

(21) Appl. No.: 11/184,835

(22) Filed: Jul. 20, 2005

(65) Prior Publication Data

US 2007/0107718 A1 May 17, 2007

(51) Int. Cl.
*F24J 2/24* (2006.01)
(52) U.S. Cl. .................. 126/569; 126/634; 126/638; 126/666; 417/207; 417/253; 417/369; 417/543; 137/154; 137/155; 165/120; 165/164
(58) Field of Classification Search ............... 126/400, 126/569, 634, 638, 636, 612, 685; 60/398, 60/531, 641; 261/151, 131; 417/207, 253, 417/389, 209, 118, 543, 437; 137/155, 154, 137/150.5, 147, 167, 205, 206; 165/120, 165/164
See application file for complete search history.

(56) References Cited

U.S. PATENT DOCUMENTS

| | | | | | |
|---|---|---|---|---|---|
| 3,937,599 | A | * | 2/1976 | Thureau et al. | 417/389 |
| 4,215,675 | A | * | 8/1980 | Embree | 126/661 |
| 4,296,729 | A | * | 10/1981 | Cooper | 126/584 |
| 4,309,148 | A | * | 1/1982 | O'Hare | 417/18 |
| 4,439,111 | A | * | 3/1984 | Seidel et al. | 417/379 |
| 4,658,760 | A | * | 4/1987 | Zebuhr | 126/374.1 |
| 4,898,519 | A | * | 2/1990 | Vanek | 417/379 |
| 5,245,984 | A | * | 9/1993 | Longmore et al. | 126/639 |
| 5,269,145 | A | | 12/1993 | Krause et al. | |
| 5,336,061 | A | * | 8/1994 | Armstrong | 417/411 |
| 5,461,862 | A | | 10/1995 | Ovadia | |
| 5,775,107 | A | | 7/1998 | Sparkman | |
| 6,996,988 | B1 | * | 2/2006 | Bussard | 60/641.8 |
| 2004/0231329 | A1 | * | 11/2004 | Carroll et al. | 60/641.8 |
| 2005/0142885 | A1 | * | 6/2005 | Shinriki | 438/706 |
| 2007/0151262 | A1 | * | 7/2007 | Bailey | 62/93 |

\* cited by examiner

*Primary Examiner*—Carl D Price
*Assistant Examiner*—Avinash Savani (57) ABSTRACT

Various embodiments of a fluid displacement system are disclosed. The system may include a reservoir containing a fluid in a liquid state and a first chamber hydraulically connected to the reservoir to receive the fluid from the reservoir. The first chamber may be configured to receive solar energy and configured to convert the received solar energy to vaporize the fluid. The system may also include a second chamber hydraulically connected to the first chamber to receive the vaporized fluid from the first chamber. The second chamber may be configured to condense the vaporized fluid, causing depressurization in the second chamber. The system may also include a hydraulic connection between the second chamber and a source of fluid to be displaced. The system may be configured such that the depressurization of the second chamber may cause fluid in the source of fluid to be displaced through the hydraulic connection.

48 Claims, 10 Drawing Sheets

SOLAR PUMP SYSTEMS AND RELATED METHODS

DESCRIPTION OF THE INVENTION

1. Field of the Invention

The present invention relates to fluid displacement systems adapted to be driven by solar energy. In particular, the present invention relates to various fluid displacement devices (e.g., pumps) that utilize solar energy to, for example, displace a controlled volume of fluid from a lower elevation to a higher elevation.

2. Description of Related Art

In many regions of the world (e.g., Africa and Middle East), consumable water resource is very much limited. On the other hand, these region typically enjoys an abundance of solar energy. Therefore, it would be highly beneficial to be able to use the solar energy to pump water from underground, to transport water from nearby stream or river, or to generate electricity.

Unfortunately, however, possibility of utilizing the solar energy as a useable source of energy has been widely ignored in many of these regions because, at least in part, most of the devices for converting solar energy to useable energy are very inefficient and prohibitively expensive.

Various solar power driven mechanical and electrical devices have been widely used in the past. Some of these devices use heat-absorbing panels that convert the absorbed solar energy to heat water or other suitable fluids. The fluid in these devices is always kept in a sub-cooled liquid state, well below its boiling point. These devices are typically equipped with one or more electrically or mechanically driven pumps to force fluid circulation within the devices. Generally, these devices yield very low efficiency mainly due to their generally low thermal gradients. The main purpose of the heat absorbing panels in these devices is to absorb solar heat and transfer it to a fluid so as to heat up the fluid. The heated fluid is then circulated by a pumping device typically driven by an external source of power, which results in decrease in overall efficiency of the device.

There have been some pumping devices that utilize solar energy as their power source. These devices include a solar panel formed of so-called "photovoltaic cells" that convert solar rays into electricity. The electricity thus generated in the solar panel is then supplied to an electric motor of the pumping device (generally positioned underground) to drive the pumping device and pump fluid. Not only is the efficiency of these systems also very low, the performance of the photovoltaic cells also degrades with the passing of time. To compensate the degradation, such a system requires a special electronic module that properly conditions the system (e.g., voltage and phase of the electrical output) to ensure that its electric motor functions correctly. Such an electronic module, however, is very expensive.

SUMMARY OF THE INVENTION

Therefore, it is accordingly an object of the present invention to provide a more efficient and/or less complicated water displacement system by directly converting solar energy to drive the system (i.e., without having to convert the solar energy to generate electricity, which in turn drives the system).

This may be achieved by utilizing one or more highly insulated solar chambers (referred to as "solar tiles") in which solar energy is absorbed to heat water (or any other suitable fluid) into vapor. Subsequently, generated vapor may be condensed in a controlled manner so as to generate a controlled pressure depression. The system is arranged in such a way that this pressure depression may cause displacement of a desired amount of fluid from one location (e.g., a lower elevation) to another location (e.g., a higher elevation) without utilizing any externally driven pumping device.

To attain the advantages and in accordance with the purpose of the invention, as embodied and broadly described herein, one aspect of the invention provides a fluid displacement system. The system may include a reservoir containing a fluid in a liquid state and a first chamber hydraulically connected to the reservoir to receive the fluid from the reservoir. The first chamber may be configured to receive solar energy and configured to convert the received solar energy to vaporize the fluid. The system may also include a second chamber hydraulically connected to the first chamber to receive the vaporized fluid from the first chamber. The second chamber may be configured to condense the vaporized fluid, causing depressurization in the second chamber. The system may also include a hydraulic connection between the second chamber and a source of fluid to be displaced.

In some exemplary aspects, the system may be configured such that the depressurization of the second chamber may cause fluid in the source of fluid to be displaced through the hydraulic connection.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EXEMPLARY EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

The pumping system, according to an exemplary embodiment of the invention, utilizes solar heat energy to displace a controlled volume of fluid (e.g., liquid), for example, from a lower elevation to a higher elevation. The system converts absorbed solar energy to vaporize (e.g., to a super-heated thermodynamic state) a working fluid (e.g., water) inside one or more vapor generating chambers (i.e., referred hereinafter as "solar tile"). The system then condenses the vapor, in a rapid controlled manner, inside a depression chamber.

Rapid condensation of the vapor may be achieved by injecting vapor-collapsing liquids (e.g., in the form of spray or jets) into the vapor-filled depression chamber. The timing and degree of condensation may be controlled by adjusting, for example, the injection timing, flow rate, and/or temperature of the vapor-collapsing liquid. As heat and mass transfer occurs between the vapor-collapsing liquid and the vapor, the vapor inside the depression chamber may be rapidly condensed, resulting in a substantial pressure drop. The depression chamber may be designed to withstand such a pressure drop. This pressure drop may be used in a variety of applications, including, for example, pumping fluid from a lower elevation to a higher elevation.

As is apparent, the pumping system of the present invention may utilize an unusual thermodynamic cycle. For example, while most thermodynamic cycles operate on the principle of fluid expansion to drive turbines or expanders, thereby converting the expansion energy of the fluid into mechanical energy, the pumping system of the present invention may operate based on the opposite principles (i.e., principles of fluid contraction). Although fluid contraction cycle may be less efficient than the classical expansion cycle due to its inherent low thermal gradient, such a system may be simpler to manufacture (i.e., thereby cost less), may not deteriorate with the passing of time, and/or may not require forced fluid circulation.

Figure 1:
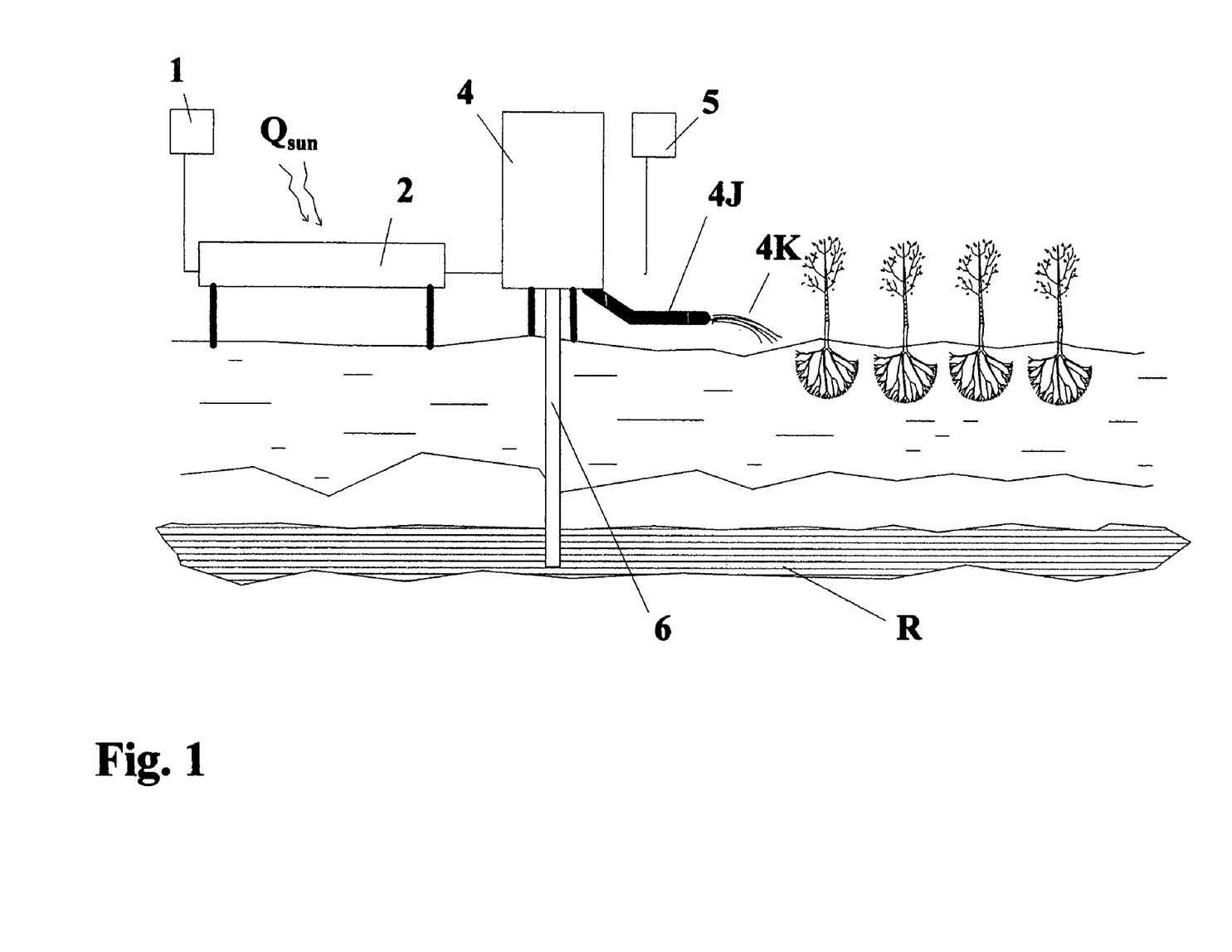
FIG. 1 is a schematic illustration of a solar pump system, according to an exemplary embodiment of the invention, illustrating an exemplary application of displacing underground water for agricultural/irrigation purposes.

According to an exemplary embodiment of the invention, FIG. 1 schematically illustrates a solar pump system configured to displace a volume of liquid from a lower elevation to a higher elevation. While the invention will be described in connection with a particular pumping arrangement (i.e., pumping liquid from a lower elevation to a higher elevation), the invention may be applied to, or used in connection with, any other types of fluid displacement situation, such as, for example, transporting fluid from one place to another. Naturally, it should be understood that the invention may be used in various applications other than pumping fluids.

As shown in FIG. 1, the solar pump system may comprise a fluid reservoir 1 containing the working fluid (e.g., water), one or more solar tiles 2 for evaporating the working fluid, the depression chamber 4 for rapidly condensing the vaporized fluid, and the injector water tank 5 containing condensing liquid used for condensing the vaporized fluid. Water will be used to describe the exemplary embodiments of the invention, particularly for the application illustrated with reference to FIG. 1. It should be understood, however, that any other fluid having suitable thermodynamic properties may be used alternatively or additionally.

With reference to FIG. 1, the fluid reservoir 1 may use gravity to inject a certain amount of water inside the solar tile 2 where heating of the water takes place via solar energy absorption indicated by $Q_{sun}$. The water in the solar tile 2 may then be transformed into vapor (e.g., super-heated steam), and the vapor may flow (e.g., via natural circulation) to the depression chamber 4, where the vapor may be accumulated. The depression chamber 4 may be designed to sustain a substantial amount of negative pressure, and may be equipped with one or more valves (shown in, for example, FIG. 2) to purge substantially all non-condensable gases present in the depression chamber 4. Once a predetermined amount of vapors are accumulated in the depression chamber 4, the injector water tank 5 injects sub-cooled water jet (e.g., via gravity) inside the depression chamber 4, causing an instant pressure drop inside the depression chamber 4. At this time, the system may reset the water levels inside the fluid reservoir 1 and the injector water tank 5, and a properly timed valve systems (described with reference to FIG. 2) may be actuated to allow suction of water from a reservoir R, normally situated at a lower elevation (e.g., underground water reservoir), through a hydraulic connection 6 into the depression chamber 4, normally located at a higher elevation. The water 4K suctioned from the reservoir R may then be discharged from the depression chamber 4 via a hydraulic connection 4J to various purposes, such as, for example, agricultural irrigation or hydropower production. In some exemplary embodiments, the hydraulic connection 6 may include a redirecting member (e.g., T-junction with check valves) such that the water in the reservoir R may bypass the depression chamber 4 and be directly discharged (e.g. in case the fluid to be pumped is different from the working fluid inside the depression chamber 4).

Figure 2:
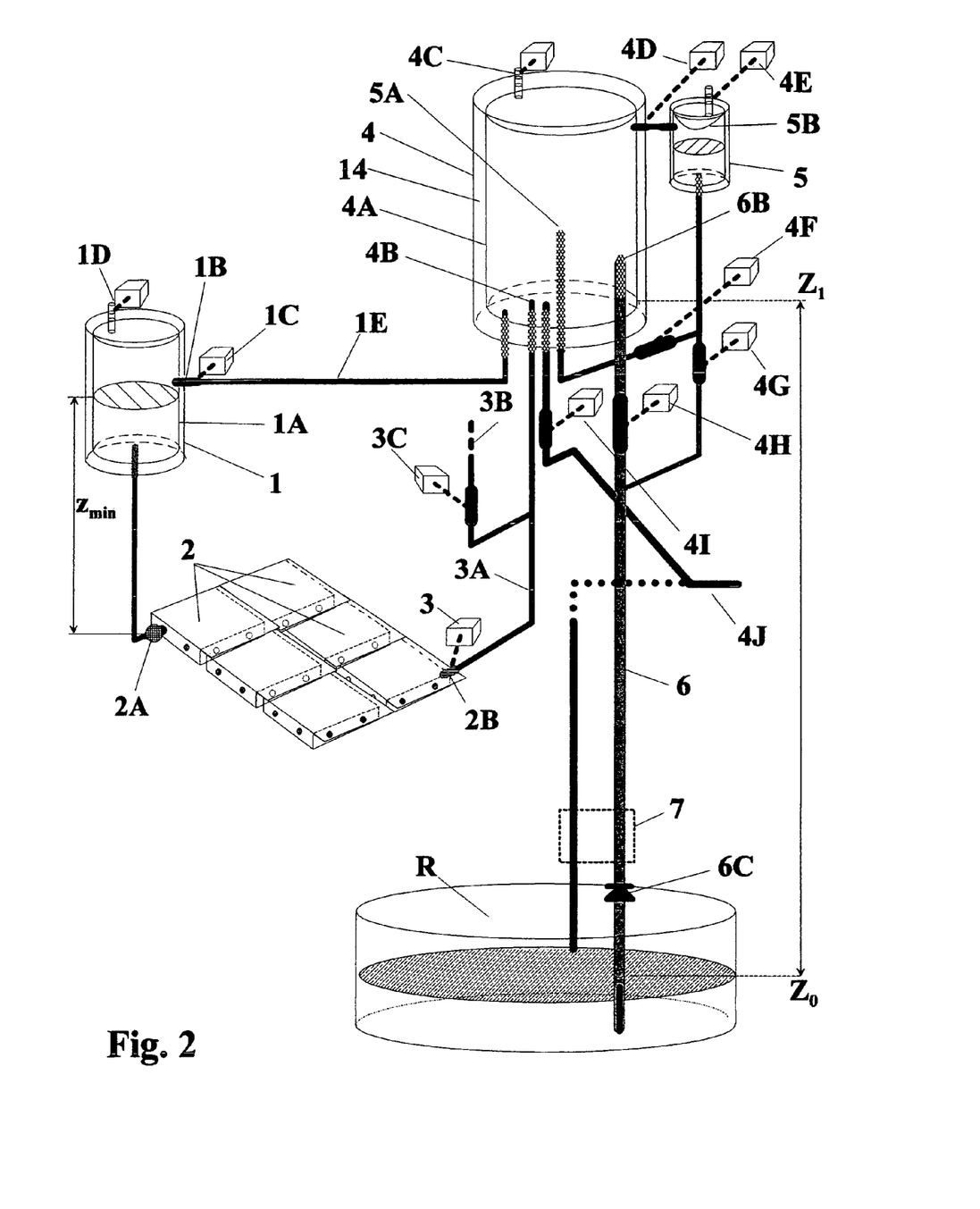
FIG. 2 is a schematic of a solar pump system, shown in FIG. 1, illustrating various components thereof.

With reference to FIG. 2, various operational processes are described in detail. The reservoir 1 may receive water from depression chamber 4 via condensate line 1E and accumulate therein. Alternatively or additionally, the reservoir 1 may be connected to an external source of water supply. The reservoir 1 may include one or more valves 1B configured to be actuated automatically (or through actuator 1C) based on the temperature and/or pressure inside the fluid reservoir 1 or the depression chamber 4.

The reservoir 1 may be hydraulically connected to one or more solar tiles 2, either individually or in a group (e.g., in series or in parallel) as will be described further herein. The reservoir 1 may be placed at an elevation higher than that of the solar tiles 2 (e.g., $Z_{min}$) such that the water may be introduced from the reservoir 1 to the solar tiles 2 via gravity. Alternatively or additionally, the water may be supplied to the solar tiles 2 by pressurizing the reservoir 1 or by pumping water directly into solar tiles 2. As shown in FIG. 2, inlets of the solar tiles 2 may include flow control valve 2A to control the amount of water being introduced into the solar tiles 2. The valve 2A may be a thermostat valve that may automatically open and close based on the temperature and/or pressure inside the solar tiles 2.

The reservoir 1 may be insulated. The water in the reservoir 1 may be at the atmospheric pressure and temperature. Alternatively, the water may be heated and/or pressurized. In some exemplary embodiments, the water may be preheated by using solar heat to speed-up the vaporization process inside the solar tiles 2. For this purpose, the reservoir 1 itself may be configured to receive solar energy. For example, at least a portion of the reservoir 1 may be made of a material that is transparent to solar irradiation, such that the solar rays may heat-up the inner portion 1A of the reservoir 1. In an exemplary embodiment, the inner portion 1A of the reservoir 1 may be coated with a material having a relatively high absorptivity and low reflectivity.

Figures 4A, 4B, 4C, 4D, 4E:
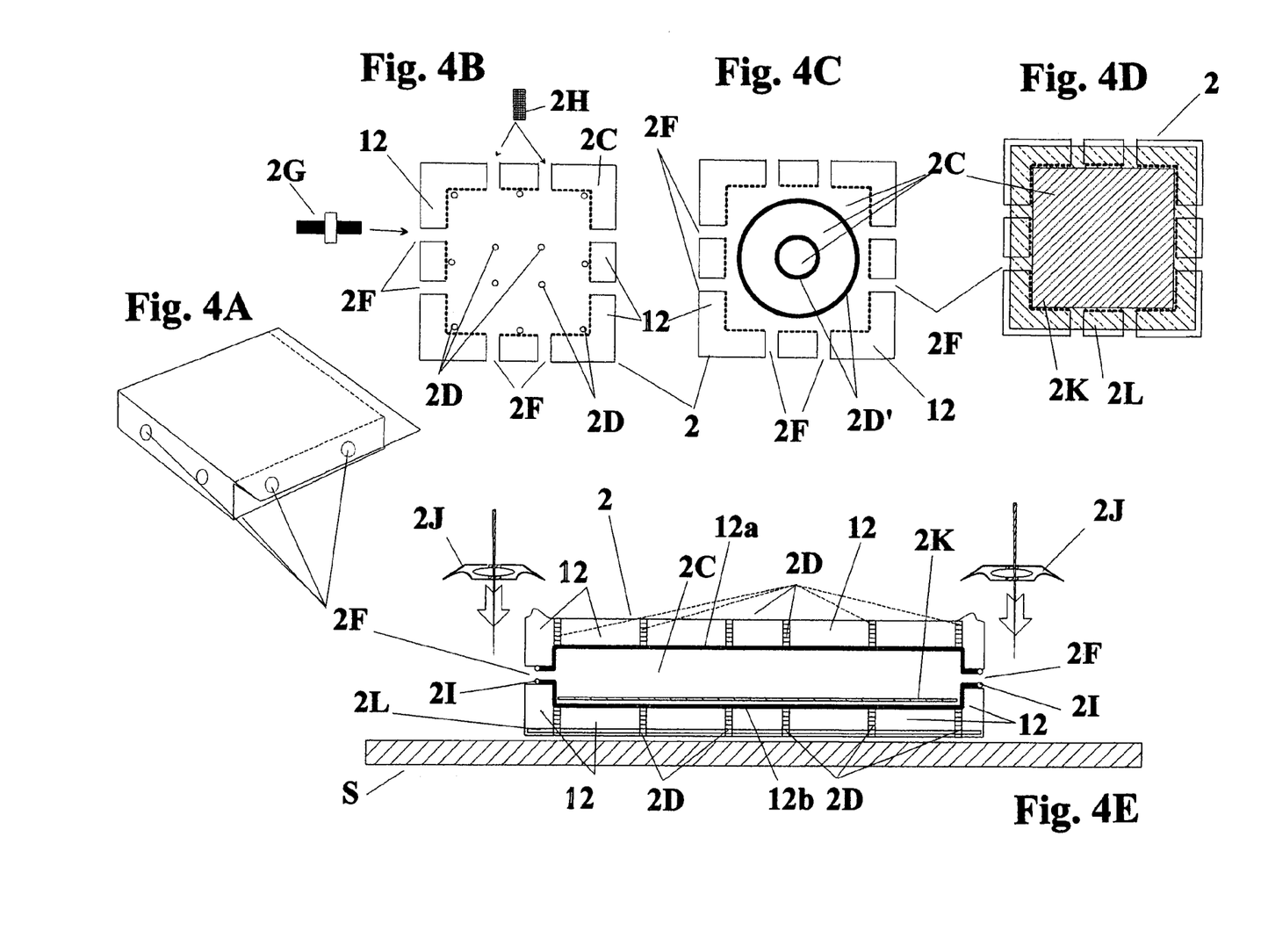
FIG. 4A is a perspective view of a solar tile, according to an exemplary embodiment of the invention.
FIGS. 4B, 4C, and 4D are top views of a solar tile, according to various exemplary embodiments of the invention, illustrating various exemplary arrangement of spacers.
FIG. 4E is a side cross-sectional view of the solar tile shown in FIG. 4A.

As shown in FIGS. 4A through 4E, the solar tile 2 may include an internal chamber 2C that is configured to utilize the solar energy to vaporize the water contained therein. To enhance the heat absorption, a sheet of highly absorbing material 2K may be placed inside the internal chamber 2C, as shown in FIG. 4E. Alternatively, the bottom surface of the internal chamber 2C may be coated with a similar material. This absorbing material may act as a solar heat accumulator that releases the heat to the water passing therethrough. The color of the absorbing material 2K may be selected to match the color of the surface S.

Once a predetermined amount of water is introduced into the solar tiles 2, the solar irradiation received therein may be transferred to the water and the water may vaporize. This process may be thermodynamically represented as process $1 \rightarrow 1' \rightarrow 2$ in the T-S diagram of FIG. 3. Process $1 \rightarrow 1' \rightarrow 2$ is a heat addition process (e.g. $Q_{sun}$) moving along the isobaric line P1 in which water transforms from a sub-cooled liquid state into a superheated state at point 2 on isobar line P1.

At least a portion of the outer surface of the internal chamber 2C may be surrounded by a suitable insulation, such as, for example, a vacuum jacket. The solar tile 2, including the vacuum jacket, may be made of materials that sufficiently allow penetration of solar radiation.

The solar tile 2 is not limited to a particular dimensional and/or geometric configuration as long as the solar tile 2 may maintain its structural integrity, for example, against any foreseeable pressure variations. By way of example only, the pressure inside the internal chamber 2C may be above the atmospheric pressure, and the pressure on the outer surface of the solar tile 2 may be at the atmospheric pressure range.

In some exemplary embodiment, the vacuum jacket 12 may be formed by a hollow, box-like member 12a, 12b surrounding the outer surfaces of the internal chamber 2C. In some exemplary embodiments, a layer of a reflective material 2L (e.g., Aluminum foil) may be placed inside the vacuum jacket 12 (e.g., at the bottom of the vacuum jacket 12), as shown in FIGS. 4D and 4E, to increase the energy transfer effect of the solar rays on the solar tiles 2. Alternatively, the reflective material 2L may be placed underneath the solar tiles 2 prior to installing the solar tiles 2.

The vacuum jacket may include a number of spacers 2D, 2D', as shown in FIGS. 4B and 4C, disposed between the two largest surfaces of the vacuum jacket 12 to prevent or minimize inward bending of the surfaces caused by its vacuum condition. The spacers 2D may simply be pins appropriately arranged to distribute the load upon the vacuum jacket 12, as shown in FIG. 4B. The spacers 2D may be made as thin as possible to minimize heat conduction therethrough from the internal chamber 2C to the outer surfaces of the solar tiles 2. To facilitate solar irradiation, the spacers 2D may be coated with a reflective material so as to amplify the effect of solar radiation. In alternative embodiment, as shown in FIG. 4C, the spacers 2D may form one or more circular sections 2D' (e.g., concentric rings).

Alternatively or additionally, the solar tile 2 may include a structural reinforcement on at least two sides of the solar tile 2. For example, the structural reinforcement may be provided by the structure of the inlets and/or outlets 2F of the internal chamber 2C. While they provide hydraulic paths of the fluid to enter and/or exit the solar tile 2, the inlets and/or outlets 2F may provide a fixed spacing in the vacuum jacket 12 and thereby distribute the load on the sides of the solar tile 2, which may prevent buckling or bending of the solar tile 2.

As shown in FIGS. 4B, 4C, and 4D, the solar tile 2 may have inlets and outlets 2F that may be arranged symmetrically with respect to one another. For example, each side of the solar tile 2 may have one or more inlets and/or outlets. This configuration may facilitate interconnection between the tiles, as will be described further herein. Of course, the inlet and/or outlet may be disposed on only one side or two adjacent or opposite sides. It should be understood that any other arrangement, including non-symmetrical arrangement, may also be possible.

Figure 6A:
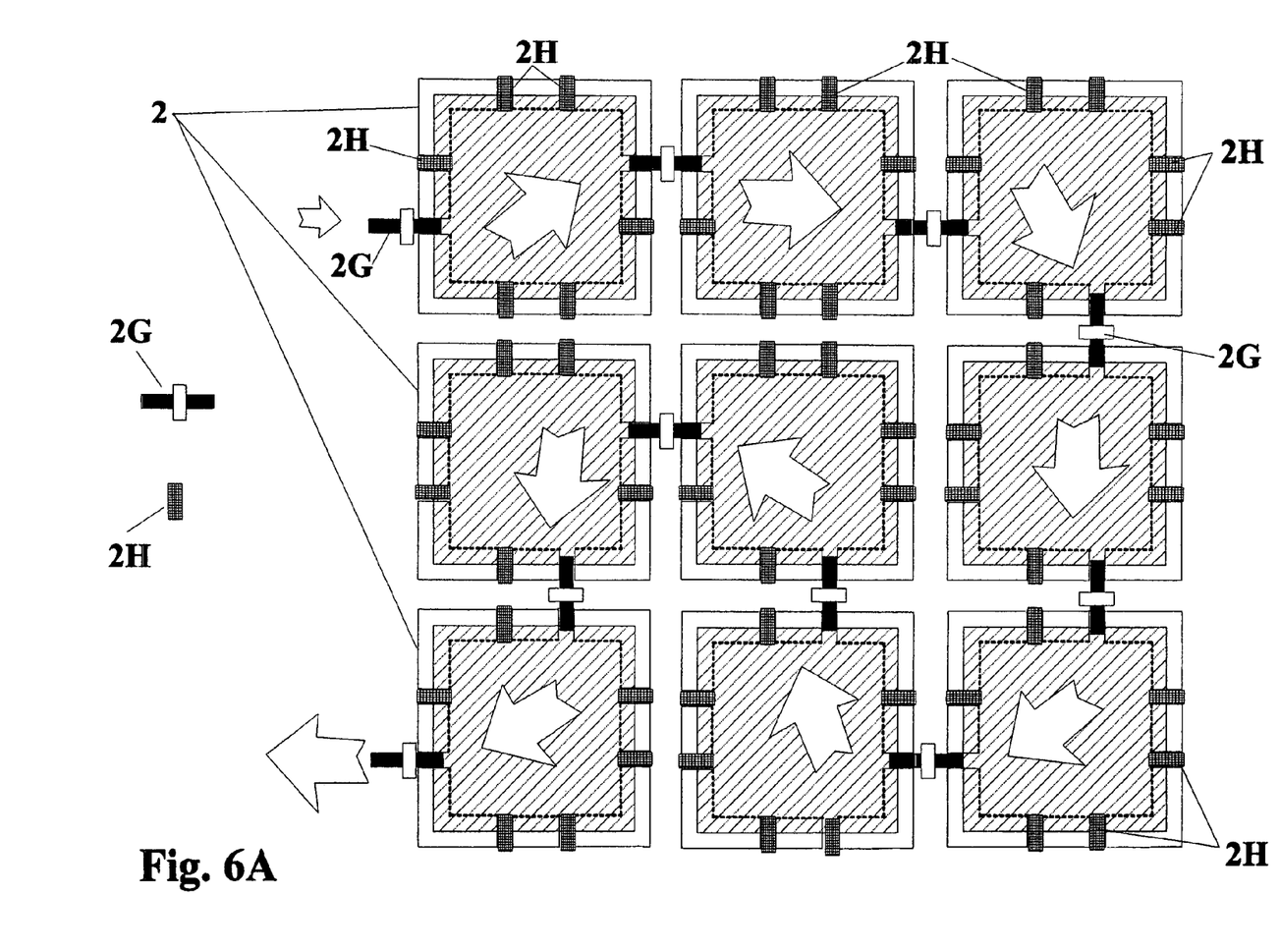
FIG. 6A is a schematic illustrating an arrangement of multiple solar tiles, hydraulically connected in a series, according to an exemplary embodiment of the invention.
Figure 6B:
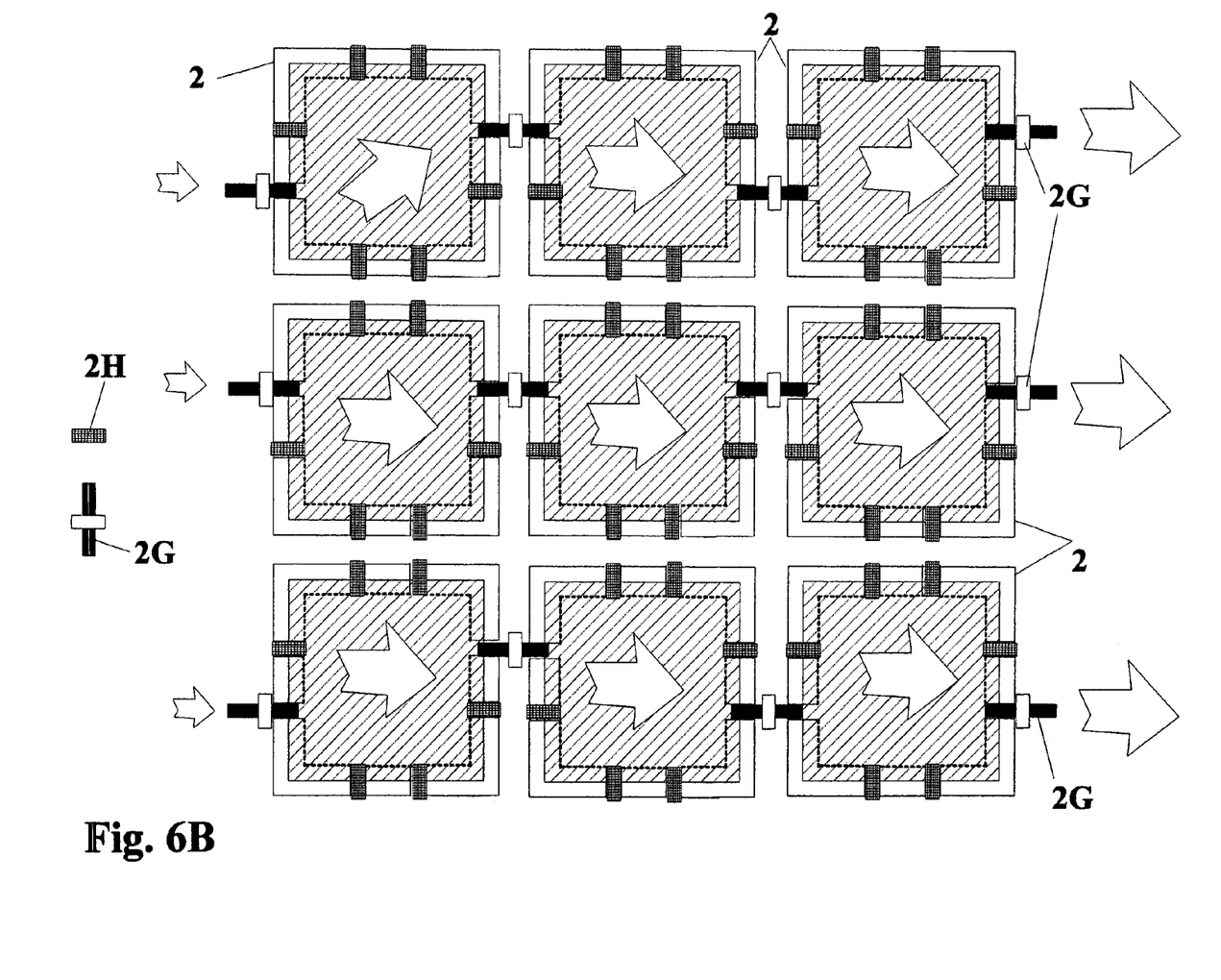
FIG. 6B is a schematic illustration of an arrangement of multiple solar tiles, hydraulically connected in parallel, according to another exemplary embodiment of the invention.

As mentioned above, the solar tiles 2 may be connected to the reservoir 1 and the depression chamber 4, either individually or in one or more groups. For example, each solar tile 2 may be individually connected to the reservoir 1 and the condensation chamber 4. While the hydraulic connection may be complicated, this arrangement may enable each solar tile 2 to operate independently of the other. Alternatively, the solar tiles 2 may be connected to the reservoir 1 and the depression chamber 4 in one or more groups. For example, as shown in FIG. 6A, the solar tiles 2 may be connected in series by utilizing hydraulic joints 2G and plugs 2H. Alternatively, as shown in FIG. 6B, a plurality of the solar tiles 2 may be connected in parallel (e.g., in groups of three). It should be appreciated that by appropriately closing and opening the inlets and outlets 2F with plugs 2H and hydraulic joints 2G, respectively, the solar tiles 2 may be interconnected in a variety of different configurations (e.g., parallel, serial, or series-parallel combination) with as many additional solar tiles 2 as desired (e.g., to cover a large surface).

The hydraulic joint 2G may be a simple hydraulic connector, and may include a snap-coupling mechanism for quick connection. The hydraulic joint 2G may include a valve, such as, for example, a thermostatic valve or a check valve that may automatically actuate depending on the temperature and/or pressure inside the solar tile 2. To minimize heat losses through the plug 2H, the plug 2H may be a hollow tube with both ends closed. Preferably, the hollow space within the tube may be maintained in a vacuum condition.

When multiple solar tiles 2 are installed side-by-side on a surface exposed to the sun, joining strips 2J may be placed between the solar tiles 2 to prevent water or other environmental debris from accumulating therebetween. The joining strips 2J may also be used as a fixture mechanism for securing the solar tiles 2 to the surface S upon which they are installed. For example, as shown in FIG. 4E, suitable fasteners (e.g., nails, pins, staples, etc.) may pass through the joining strips 2J to secure the solar tiles 2 onto the desired surface S. In addition, the joining strips 2J may provide further insulation of the hydraulic joints 2G. In some exemplary embodiments, the surface S may be a roof of a house or building or any vertically or horizontally extended surface.

Figures 4F, 4G:
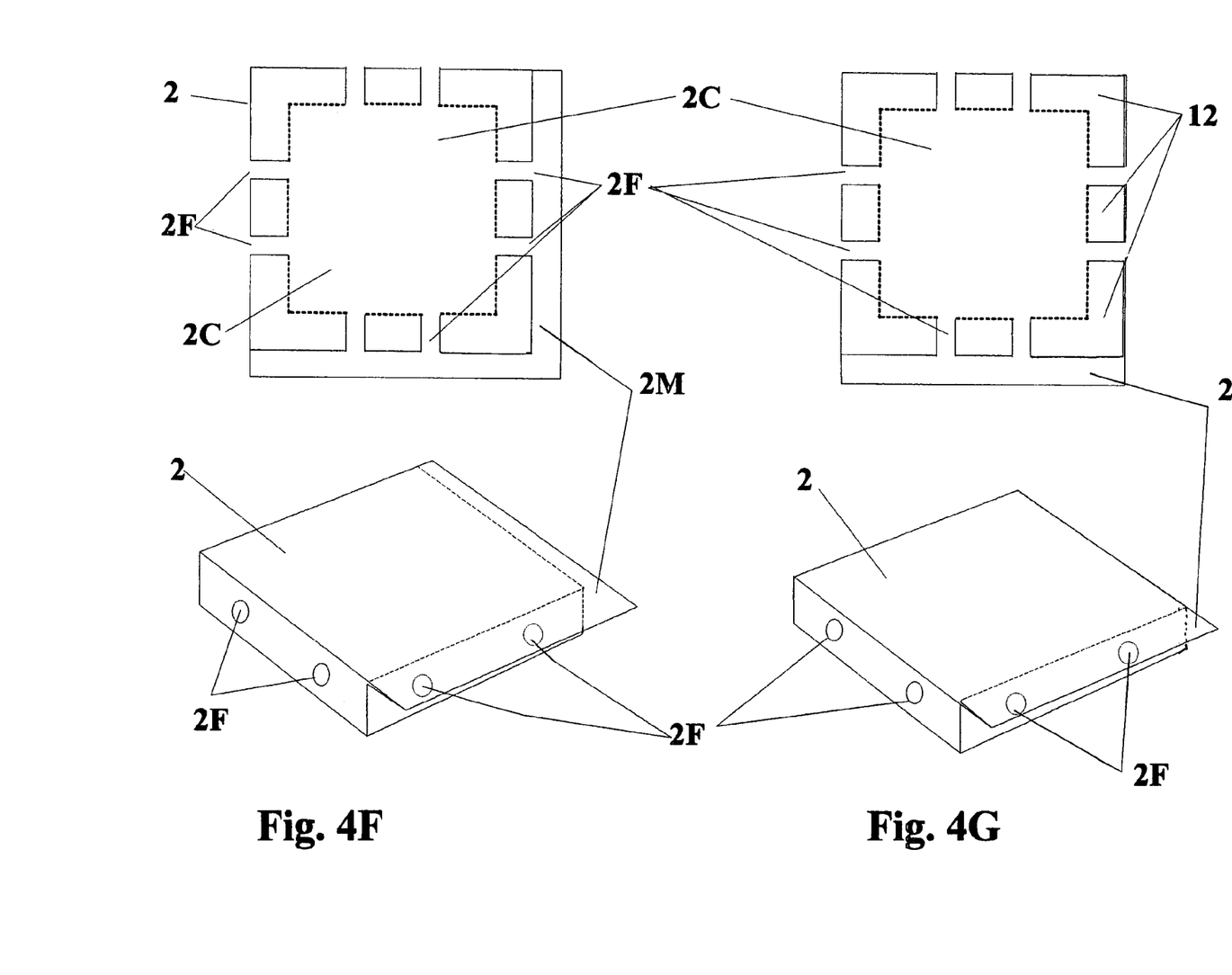
FIG. 4F is top and perspective views of a rectangular solar tile, according to an exemplary embodiment of the invention.
FIG. 4G is top and perspective view of a rectangular solar, according to another exemplary embodiment of the invention, illustrating a different overlapping flap.
Figure 5A:
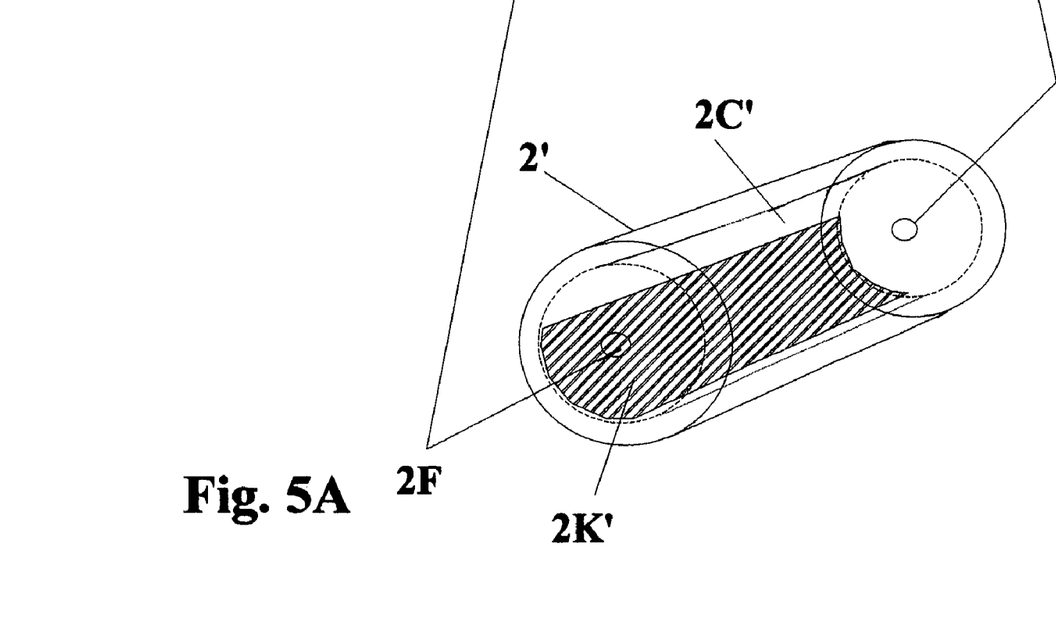
FIGS. 5A and 5B are perspective and cross-sectional views of a solar tile, according to another exemplary embodiment of the invention.
Figure 5B:
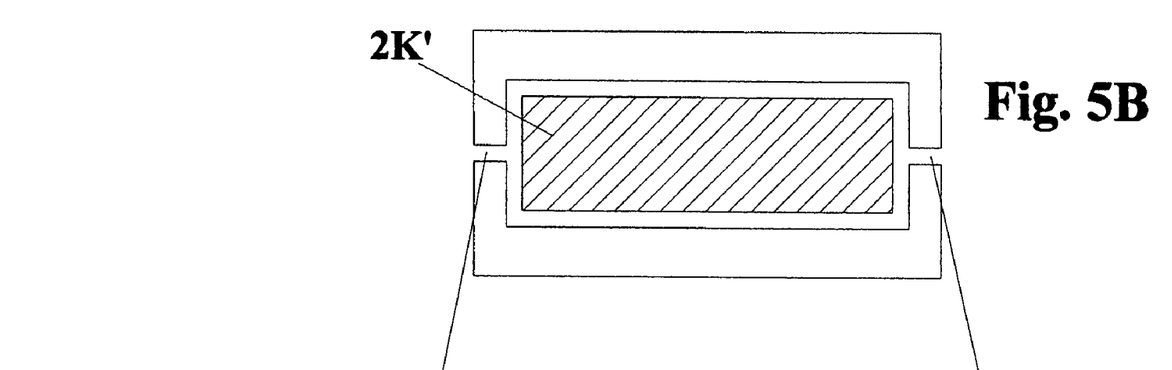

According another exemplary embodiment of the invention, the top surface of the solar tile 2 may include extended flanges or flaps 2M, 2N that may extend, from one or more sides, beyond the planar dimension of the vacuum jacket 12 and the internal chamber 2C, as shown in FIGS. 4F and 4G. The extended flanges 2M, 2N may provide functions similar to those of the strip joints 2J described above, including prevention of water flow between the solar tiles 2. According to various exemplary embodiments, the solar tile may have a variety of different geometrical shapes. By way of example only, as shown in FIGS. 5A and 5B, the solar tile 2' may have a cylindrical geometry.

Figure 6C:
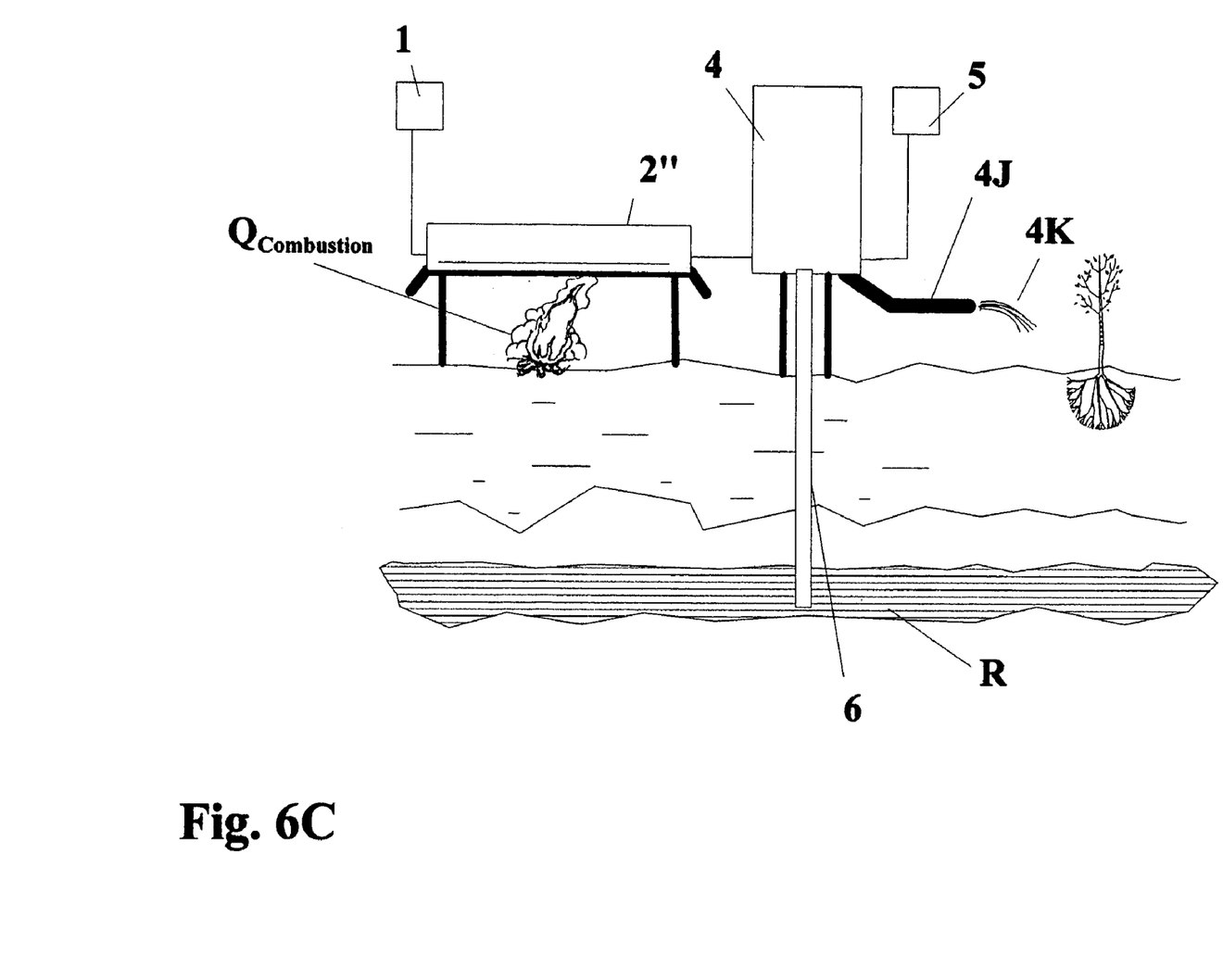
FIG. 6C is a schematic illustration of a pumping system, according-to another exemplary embodiment of the invention, illustrating a possibility of using combustion of any fuel (e.g., wood/coal) as an additional or alternative energy source.

In some exemplary embodiments, the solar tiles 2" may be configured to be heated by an external source of heat energy, other than the solar energy, as shown in FIG. 6C. For example, the bottom portion of the tile may be may be configured to receive heat from an external heat source, such as, for example, a combustion heat $Q_{combustion}$. This configuration may be useful when the temporary weather condition does not permit continuous operation of the system.

Referring back to FIG. 2, the vapor (e.g., superheated steam) generated inside the solar tiles 2 may flow into the depression chamber 4 through a hydraulic line 3A. The line 3A may include a valve 2B (e.g., a check valve) that may be configured to control the vapor condition (e.g., degree of super-heating of the vapor) exiting from the solar tile 2 to the depression chamber 4. For example, the valve 2B may be configured to control the venting of the vapor from the solar tiles 2. The valve 2B may be automatically actuated when the temperature and/or pressure inside the solar tile 2 exceeds a predetermined threshold value.

The depression chamber 4 may be sufficiently strong so as to withstand vacuum or negative-pressure conditions. At least a portion of the chamber 4 may be coated to minimize thermal inertia. Similar to the insulation provided for the solar tiles 2, the depression chamber 4 may include a suitable insulation 14.

The vapor generated inside the solar tiles 2 may then fill the depression chamber 4. The time it takes to fill the depression chamber may vary depending on a number of factors, including but not limited to, the volume of the internal volume 4A of the depression chamber 4, the intensity of solar heat, the amount of water flowing from the fluid reservoir 1, and the number and dimension of the solar tiles 2. The depression chamber 4 may include a relief valve 4C, preferably located in the upper portion of the chamber 4, to purge non-condensable gases (e.g., air) from the depression chamber 4 as the vapor fills the depression chamber 4.

When the vapor is being accumulated inside the depression chamber 4, a certain amount of condensation may occur between the vapor and the walls of the depression chamber 4. To drain the condensate water, the relief valve 1D in the fluid reservoir 1 may be opened to equalize the pressure inside the fluid reservoir 1 with the atmospheric pressure. The condensate water in the depression chamber 4 may then flow into the fluid reservoir 1 via the hydraulic line 1E. As briefly mentioned above, the drainage of such condensate water may preheat the water in the fluid reservoir 1.

When the depression chamber 4 is sufficiently filled with vapor, all the hydraulic connections connected to the depression chamber 4, including the relief valve 4C, may be closed to substantially seal the depression chamber 4. After the depression chamber 4 is substantially sealed, a small amount of relatively cold water may be injected into the depression chamber 4. For example, the valves 4E and 4F may be opened (with valves 4D and 4G closed) to permit a small amount of cold water in the water injector tank 5 to flow into the depression chamber 4 via gravity.

The water in the water injector tank 5 may be sprayed inside the depression chamber 4. For example, the water may form a jet of continuous water 5A designed to create a film of water with as large surface-to-volume ratio as possible. Upon contact with the films of water, the vapor rapidly condenses and may cause a rapid and progressive depressurization (e.g., in a chain-reaction-like manner) inside the depression chamber 4. When a predetermined depressurization is achieved, the valve 4F may be closed to prevent any unnecessary withdrawal of water from the water injector tank 5.

Figure 3:
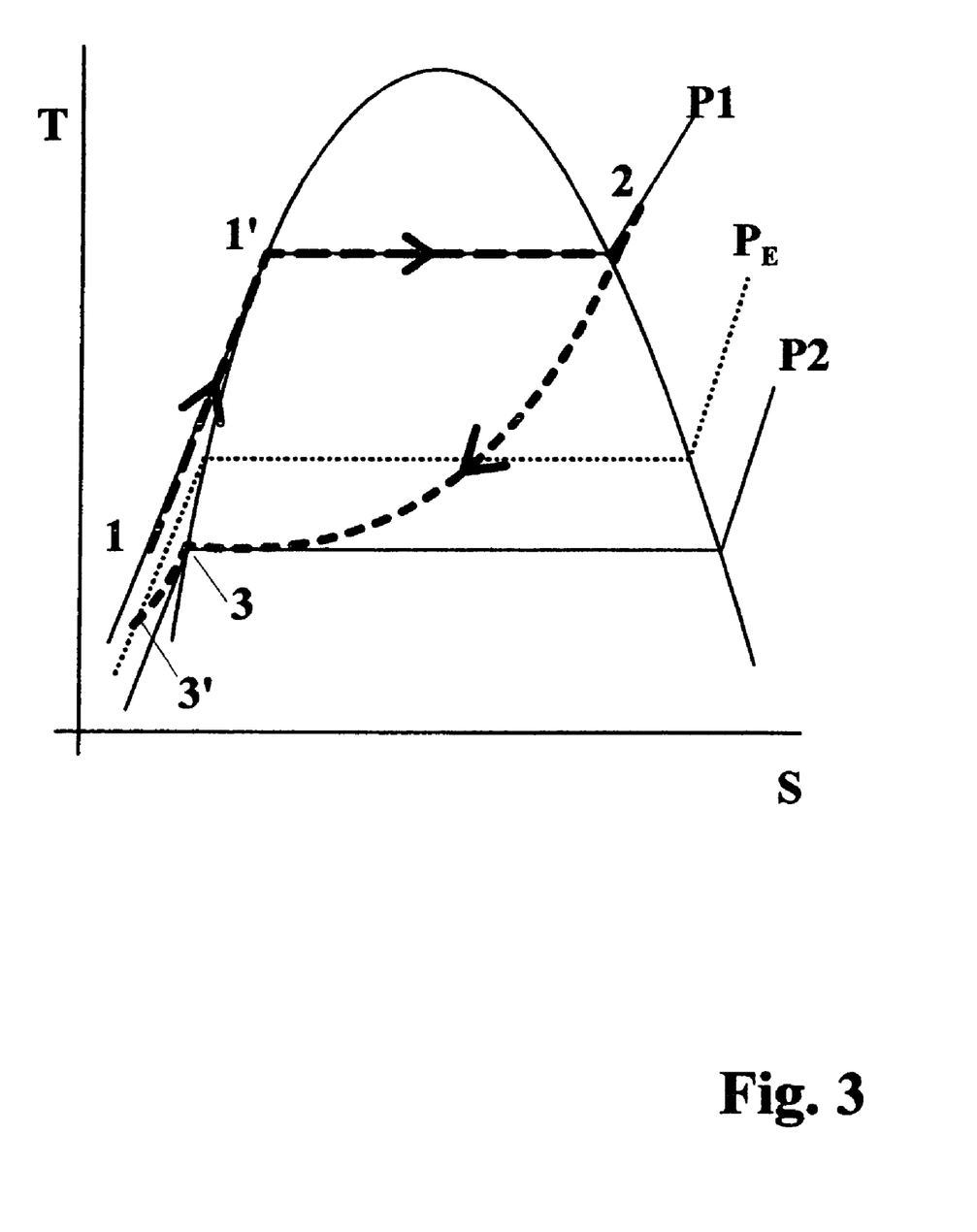
FIG. 3 is a Temperature-Entropy (T-S) diagram illustrating various exemplary thermodynamic processes of the solar pump system.

An exemplary depressurization process may be represented as the process 2→3 in the T-S diagram shown in FIG. 3. The dashed line indicates a thermodynamically irreversible process in which the vapor in the depression chamber 4 condenses while shifting from one isobaric line P1 to another isobaric line P2 with P1>P2, where P2 may be a low-grade vacuum. When the condensation of the vapor inside the depression chamber 4 is completed, the pressure inside the depression chamber 4 may be close to a vacuum because the specific volume of the vapor has been reduced significantly (e.g., ~1/1000). At this point, the depression chamber 4 may have a very low volume of water (i.e., of relatively high temperature) at the bottom of the chamber 4, while the remaining volume of the chamber 4 may be empty.

At this stage, the water injector tank 5 may be replenished. For example, by using the low-pressure condition inside the chamber 4, the valves 4D and 4G may be briefly opened to lift water to be displaced from R into the injector tank 5 and to rapidly reset the water level to a level prior to the injection of the water into the depression chamber 4. To avoid mixing of non-condensable gases inside the depression chamber 4, a flexible partition 5B may be positioned inside the tank 5. If the volume of the depression chamber 4 is much greater than the volume of the water injector tank 5, the increase in pressure (from low-vacuum levels) due to the replenishing of the water injector tank 5 may be negligible.

Figure 7:
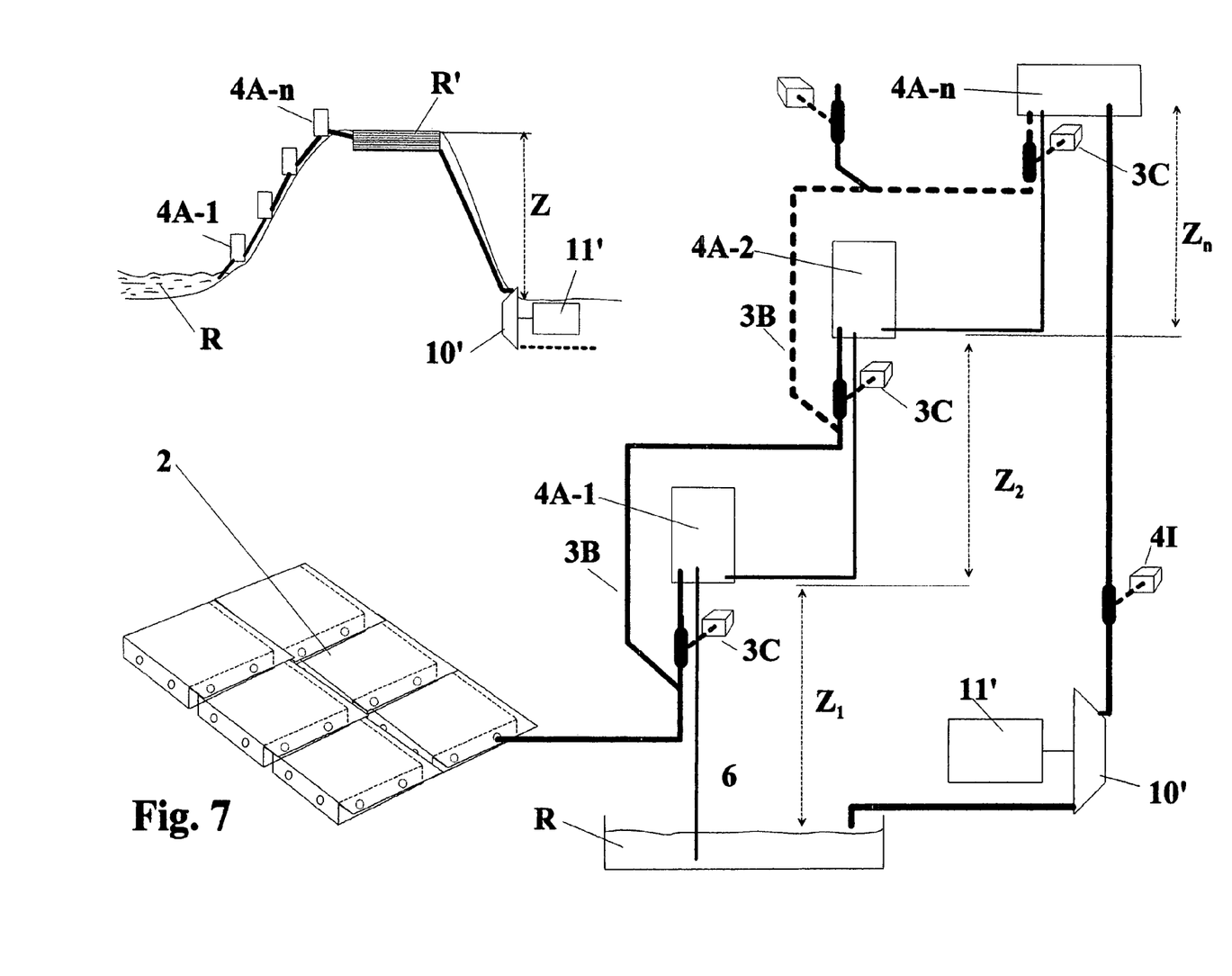
FIG. 7 is a schematic illustration of a pumping system, according still another exemplary embodiment of the invention, illustrating a possibility of having multiple solar pump systems stationed in different elevations for use in, for example, hydro-power production.

During the above-discussed depression and displacement stages, the solar tiles 2 continues to generate vapor and, depending on the time it takes to complete the depressurization cycle, the system may have one or more additional depression chambers 4. For example, when the valve 4B is closed for the depressurization cycle, the vapor generated inside the solar tiles 2 may be diverted to one or more additional depression chambers 4 via a hydraulic branch 3B and a valve 3C. An exemplary embodiment illustrating a possibility of having multiple depression chambers 4 is shown in FIG. 7. Having additional depression chambers 4 may also prevent over-pressurization of the solar tiles 2.

The depression pressure inside the depression chamber 4 may be utilized in a variety of different ways. For example, according to an exemplary embodiment of the invention, the depression pressure may be used to lift or pump water from a reservoir R located at a lower elevation (e.g., $Z_1$-$Z_0$) against gravity by opening a valve 4H positioned on a hydraulic path 6 between the depression chamber 4 and the reservoir R. When the valve 4H is opened, the significant pressure difference between the depression chamber 4 and the reservoir R may cause the water in the reservoir R to be displaced into the depression chamber 4. Alternatively or additionally, instead of displacing the water into the depression chamber 4, the water (or any other fluid in the reservoir R) may be diverted to any other location by using a suitable diversion mechanism.

The displaced water at elevation $Z_1$ may be simply released for, for example, irrigation purposes, as shown in FIGS. 1 and 6C. To release the water collected inside the depression chamber 4, a valve 4C (see FIG. 2) may be opened to vent the depression chamber 4 to the atmospheric pressure, and a valve 4I may be opened to permit the water to flow through a hydraulic line 4J. Prior to letting all the water to evacuate, the water level inside the fluid reservoir 1 may be restored by opening the valve 1C.

This displacement process may be represented in the T-S diagram of FIG. 3 as process 3→3', during which the pressure inside the depression chamber 4 may start to increase from the low-level vacuum condition while relatively cold water is flowing inside the depression chamber 4 from the reservoir R, thereby possibly decreasing the temperature (assuming the water in reservoir R is at a lower temperature). At point 3, of the T-S diagram the vapor reaches a thermodynamic equilibrium with a relatively high temperature (possibly higher than process 1) and at a near vacuum pressure P2. Point 3' represents a final equilibrium state in which the pressure inside the depression chamber 4 has increased (although still below P1). As shown in FIG. 3, points 1 and 3' may be on different isobaric lines (normally overlapping in the sub-cooled region of the T-S diagram). As the water is displaced from the reservoir R into the depression chamber 4, the pressure inside the depression chamber 4 may increase to an equilibrium pressure $P_E$ in which no more water may be lifted through the hydraulic path 6.

As shown in FIG. 2, a check valve 6C may be positioned in the hydraulic path 6 to trap a certain amount of water at elevation $Z_1$ inside the depression chamber 4. Inside the depression chamber 4, this amount of water has acquired potential energy as its elevation has changed and the depression chamber 4 may be seen as a new reservoir of water for another depression chamber 4 located at a new elevation (e.g. approximately twice as high) say elevation $Z_1$ with respect to the reservoir R and so on with as many depression chambers 4 as desired.

According to another exemplary embodiment of the invention, the solar pump system may include a plurality of condensation chambers 4A-1, 4A-2 ... 4A-n, as shown in FIG. 7. One or more solar tiles 2 may provide superheated vapor to those depression chambers 4-A-1, 4A-2 ... 4A-n, each of which may operate in the same manner described above with reference to FIGS. 1-3. While the solar tiles 2 may all be located at the same elevation, each depression chamber 4A-1, 4A-2 ... 4A-n may be equipped with a dedicated solar tile 2 to increase efficiency and the rate of vapor production.

The elevational distance between the stations is dictated by the temperature inside the depression chambers 4A-1 ... n, and the vapor pressure of the working fluid. By considering water again as the working fluid as represented in FIG. 7, a certain amount of water, mainly limited by the volumes of the depression chambers 4A-1 may be ultimately found at elevation $Z_n$ thereby forming a water body R'. From here the potential energy acquired by water body R' may be converted into usable energy by means of a turbine 10' and an alternator 11'. The water exiting turbine 11' may or may not be collected back into the water reservoir R so as to minimize water losses (e.g. if R is represented by a lake).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fluid displacement system comprising:
   a reservoir containing a first fluid in a liquid state;
   a first chamber hydraulically connected to the reservoir to receive the first fluid from the reservoir, the first chamber being configured to receive solar energy and configured to convert the received solar energy to vaporize the first fluid;
   a second chamber hydraulically connected to the first chamber to receive the vaporized first fluid from the first chamber, the second chamber being configured to condense the vaporized first fluid, causing depressurization in the second chamber; and
   a hydraulic connection directly connecting between the second chamber and a source of second fluid to be displaced,
   wherein the system is configured such that the depressurization of the second chamber causes the second fluid in the source of second fluid to flow through the hydraulic connection into the second chamber.

2. The system of claim 1, wherein the first fluid and the second fluid are different from one another.

3. The system of claim 1, wherein at least one of the first fluid and the second fluid comprises water.

4. The system of claim 1, further comprising an injector configured to inject condensing liquid into the second chamber to condense the vaporized first fluid therein.

5. The system of claim 4, further comprising an injector tank for supplying the condensing liquid to the injector.

6. The system of claim 4, wherein the condensing liquid is in a sub-cooled state.

7. The system of claim 4, wherein the injector is configured to spray the condensing liquid into the second chamber.

8. The system of claim 1, wherein the first fluid in the reservoir flows to the first chamber via gravity.

9. The system of claim 1, wherein the hydraulic connection between the reservoir and the first chamber comprises a valve configured to be actuated automatically based on a parameter inside at least one of the reservoir, the first chamber, and the second chamber.

10. The system of claim 9, wherein the parameter comprises at least one of pressure and temperature.

11. The system of claim 9, wherein the valve comprises a flow control valve configured to control an amount of water being introduced into the first chamber.

12. The system of claim 1, wherein the first chamber comprises a heat absorbing material.

13. The system of claim 1, wherein the first chamber is in the form of a tile.

14. The system of claim 1, wherein the first chamber comprises an insulator surrounding at least a portion of the first chamber.

15. The system of claim 14, wherein the insulator comprises a vacuum jacket.

16. The system of claim 15, wherein the vacuum jacket comprises a reflective material placed inside the vacuum jacket.

17. The system of claim 1, wherein the first chamber comprises a plurality of first chambers.

18. The system of claim 17, wherein the plurality of first chambers are hydraulically connected in series between the reservoir and the second chamber.

19. The system of claim 17, wherein the plurality of first chambers are hydraulically interconnected to each other.

20. The system of claim 17, wherein the plurality of first chambers are hydraulically connected in parallel between the reservoir and the second chamber, wherein each of the plurality of first chambers is hydraulically connected individually to at least one of the reservoir and the second chamber.

21. The system of claim 17, wherein the plurality of first chambers are placed adjacent to one another.

22. The system of claim 21, further comprising a joining strip to cover a space between the plurality of first chambers.

23. The system of claim 21, wherein at least one of the plurality of first chambers comprises an extended flange configured to cover a space between the plurality of first chambers.

24. The system of claim 1, wherein the first chamber is configured to receive energy from an external heat source other than the solar energy.

25. The system of claim 24, wherein the external source of energy is a combustion heat.

26. The system of claim 1, wherein the hydraulic connection between the first chamber and the second chamber comprises a valve configured to control a vapor condition of the vaporized first fluid flowing from the first chamber to the second chamber.

27. The system of claim 26, wherein the valve is configured to be automatically actuated when the pressure and/or temperature inside the first chamber exceeds a threshold value.

28. The system of claim 1, wherein the second chamber comprises a relief valve located in an upper portion of the second chamber and configured to release non-condensable fluid.

29. The system of claim 1, wherein the second chamber is hydraulically connected to the reservoir to allow the condensed first fluid to flow to the reservoir.

30. The system of claim 1, wherein the second chamber comprises a plurality of second chambers.

31. The system of claim 1, wherein the plurality of second chambers are placed at different elevations from one another.

32. The system of claim 1, wherein the second chamber comprises a discharge connection configured to discharge the fluid flown into the second chamber.

33. A method of displacing fluid comprising:
allowing a first fluid in a reservoir to flow into a first chamber;
heating the first chamber with solar energy so as to vaporize the first fluid in the first chamber;
allowing the vaporized first fluid to flow from the first chamber to a second chamber;
condensing the vaporized first fluid, causing depressurization in the second chamber;
directly connecting the second chamber to a source of second fluid to be displaced through a hydraulic connection; and
using the depressurization of the second chamber to cause a second fluid in the source of second fluid to flow through the hydraulic connection into the second chamber.

34. The method of claim 33, wherein the first fluid and the second fluid are different from one another.

35. The method of claim 33, wherein at least one of the first fluid and the second fluid comprises water.

36. The method of claim 33, wherein condensing the vaporized first fluid comprises injecting condensing liquid into the second chamber to condense the vaporized first fluid therein.

37. The method of claim 33, wherein the first chamber comprises an insulator surrounding at least a portion of the first chamber.

38. The method of claim 37, wherein the insulator comprises a vacuum jacket.

39. The method of claim 33, wherein the first chamber comprises a plurality of first chambers.

40. The method of claim 39, wherein the plurality of first chambers are hydraulically connected in series between the reservoir and the second chamber.

41. The method of claim 39, wherein the plurality of first chambers are hydraulically connected in parallel between the reservoir and the second chamber, wherein each of the plurality of first chambers is hydraulically connected individually to at least one of the reservoir and the second chamber.

42. The method of claim 33, further comprising heating the first chamber with an external heat source other than the solar energy.

43. The method of claim 33, further comprising controlling a vapor condition of the vaporized first fluid flowing from the first chamber to the second chamber via a valve.

44. The method of claim 43, wherein the valve is configured to be automatically actuated when the pressure and/or temperature inside the first chamber exceeds a threshold value.

45. The method of claim 33, further comprising allowing the condensed first fluid to flow into the reservoir.

46. The method of claim 33, wherein the second chamber comprises a plurality of second chambers.

47. The method of claim 33, wherein the plurality of second chambers are placed at different elevations from one another.

48. The method of claim 33, wherein the second chamber comprises a discharge connection configured to discharge the fluid flown into the second chamber.

* * * * *